US011536103B2

(12) United States Patent
Parthasarathy et al.

(10) Patent No.: US 11,536,103 B2
(45) Date of Patent: Dec. 27, 2022

(54) INTEGRATED CONTROL SYSTEM FOR A WELL DRILLING PLATFORM

(71) Applicant: ADS Services LLC, Midland, TX (US)

(72) Inventors: Anand Parthasarathy, Cypress, TX (US); Richard J. Todd, Houston, TX (US); Scott Charles, Houston, TX (US)

(73) Assignee: ADS SERVICES, LLC, Midland, TX (US)

( * ) Notice: Subject to any disclaimer, the term of this patent is extended or adjusted under 35 U.S.C. 154(b) by 0 days.

(21) Appl. No.: 17/360,491

(22) Filed: Jun. 28, 2021

(65) Prior Publication Data

US 2021/0324692 A1    Oct. 21, 2021

Related U.S. Application Data

(63) Continuation of application No. 16/331,416, filed as application No. PCT/US2017/051818 on Sep. 15, 2017, now Pat. No. 11,047,182.

(60) Provisional application No. 62/394,942, filed on Sep. 15, 2016.

(51) Int. Cl.
  *E21B 44/00* (2006.01)
  *E21B 21/08* (2006.01)
  *G05B 15/02* (2006.01)

(52) U.S. Cl.
  CPC .............. *E21B 21/08* (2013.01); *E21B 44/00* (2013.01); *G05B 15/02* (2013.01)

(58) Field of Classification Search
  CPC .................................. E21B 44/00; E21B 21/08
  See application file for complete search history.

(56) References Cited

U.S. PATENT DOCUMENTS

| | | | |
|---|---|---|---|
| 2004/0182574 A1* | 9/2004 | Adnan | G05B 15/02 379/268 |
| 2005/0092523 A1* | 5/2005 | McCaskill | E21B 21/08 175/218 |
| 2006/0207795 A1 | 9/2006 | Kinder et al. | |
| 2006/0240818 A1 | 10/2006 | McCoy et al. | |

(Continued)

FOREIGN PATENT DOCUMENTS

| WO | 2013152078 A2 | 10/2013 |
|---|---|---|
| WO | 2015023411 A1 | 2/2015 |

OTHER PUBLICATIONS

EP search report for EP19161622.6 dated Jul. 25, 2019.
(Continued)

*Primary Examiner* — Kipp C Wallace

(57) ABSTRACT

An integrated control system (ICS) for a well drilling platform is provided, which well drilling platform has a plurality of control systems and devices. The ICS includes an ICS controller is in communication with a master control. The ICS controller includes a memory device coupled to a processor. Instructions executed by the processor cause the ICS controller to: communicate with each of the control systems to determine a status of each of the control systems; cause the master control display to display status information for at least one of the control systems; in response to an operator input perform a well drilling platform function, the function requiring a coordinated state between a first control system and at least a second control system, configure the first control system and the second control system into a coordinated state.

16 Claims, 7 Drawing Sheets

(56) References Cited

U.S. PATENT DOCUMENTS

| | | |
|---|---|---|
| 2007/0246263 A1 | 10/2007 | Reitsma |
| 2008/0094247 A1 | 4/2008 | Milne |
| 2012/0118636 A1 | 5/2012 | Koederitz |
| 2012/0165997 A1* | 6/2012 | Lewis ..................... E21B 21/08 700/282 |
| 2013/0231781 A1 | 9/2013 | Chapman |
| 2015/0047834 A1 | 2/2015 | Nott et al. |
| 2015/0053483 A1 | 2/2015 | Mebane, III |
| 2016/0076356 A1 | 3/2016 | Krems et al. |
| 2016/0097270 A1 | 4/2016 | Pobedinski et al. |
| 2016/0222775 A1* | 8/2016 | Tunc ....................... E21B 44/00 |
| 2016/0290119 A1 | 10/2016 | Tunc et al. |
| 2017/0226813 A1* | 8/2017 | Northam ................. E21B 21/08 |
| 2017/0335654 A1* | 11/2017 | Olsen .................. E21B 41/0092 |
| 2018/0135366 A1 | 5/2018 | Olsen et al. |
| 2019/0078405 A1* | 3/2019 | Zheng ..................... E21B 21/08 |

OTHER PUBLICATIONS

EP: Communication Pursuant to Article 94(3) EPC of EP Application 19161622.6 (related application); dated Mar. 1, 2021; 8pages.
European Patent Office: Communication Pursuant to Article 94(3) EPC of EP Application 19161622.6 (related application); dated Jul. 8, 2022; 4 pages.

* cited by examiner

INTEGRATED CONTROL SYSTEM FOR A WELL DRILLING PLATFORM

CROSS-REFERENCE TO RELATED APPLICATIONS

This application is a continuation of U.S. patent application Ser. No. 16/331,416, filed Mar. 7, 2019, entitled INTEGRATED CONTROL SYSTEM FOR A WELL DRILLING PLATFORM, issuing as U.S. Pat. No. 11,047,182 on Jun. 29, 2021, which is a National Stage Entry of PCT Application No. PCT/US2017/051818, filed Sep. 15, 2017, which claims benefit of U.S. Provisional Application No. 62/394,942, filed Sep. 15, 2016, all of the aforementioned being incorporated herein by reference in their entirety for all purposes.

TECHNICAL FIELD

The present disclosure relates to control systems for subterranean wells that produce hydrocarbon oil and gas products, and to integrated control systems for the same.

BACKGROUND

Subterranean wells (subsea or land based) are typically created by drilling a hole into the earth with a drilling rig that rotates a drill string that includes a hollow drill pipe and a drill bit attached to an end of the drill pipe. After the hole is drilled, casing sections are inserted into the hole to provide structural integrity to the newly drilled wellbore, and in some instances to isolate potentially dangerous high pressure zones from each other and from the surface. This process may be repeated several times (e.g., two to five times) at increasingly smaller bore diameters to create a well at a desired depth.

The drill bit is configured to cut into whatever material (e.g., rock) is encountered during the drilling process. To facilitate the drilling process, a drilling fluid (often referred to as "mud") is typically pumped down the inside of the drill pipe and exits at the drill bit. The drilling fluid may be a fluid, or may be a mixture of fluids, solids and chemicals that is tailored to provide the correct physical and chemical characteristics required to safely drill the well; e.g., cool the drill bit, lift cuttings to the surface, prevent destabilization of the rock in the wellbore walls, overcome the pressure of fluids inside the rock so that these fluids do not enter the wellbore, etc. The debris (often referred to as "cuttings") generated by the drilling process is swept up by the drilling fluid as it circulates back to surface outside the drill pipe. The drilling fluid and debris is subsequently processed to separate the cuttings and return the circulating drilling fluid to the drilling process. A pumping system (typically referred to as a "mud pump") is typically used to circulate the drilling fluid.

During the drilling process, the fluids located at the bottom of the well are said to be at a "bottomhole" pressure ($P_{BH}$), which pressure is a function of the hydrostatic pressure within the well and may also be a function of annular friction pressure during a dynamic condition. For a variety of reasons, it is desirable to maintain a substantially constant $P_{BH}$ that is higher than the fluid pressure in the local formation (i.e., the formation pressure). During the drilling process, however, the drilling may encounter a well region that contain fluids (e.g., oil and gas) at a relatively elevated high pressure (i.e., a formation pressure that is higher than the $P_{BH}$). The elevated formation pressure is typically referred to as a "kick", and if the kick is great enough and unchecked could lead to a "blowout". There are several techniques and methodologies currently available for addressing "kicks". For example, virtually all modern wells include one or more blowout preventers. A blowout preventer (BOP) is a large, specialized device that is used to seal, control and monitor and oil and/or gas well to prevent an uncontrolled release of crude oil and/or natural gas from a well (i.e., a blowout). Blowout preventers are utilized to provide a fail-safe, but do not themselves control pressure within the well.

Some wells utilize a "managed pressure drilling" (MPD) system during the normal course of drilling that is configured to maintain a substantially constant $P_{BH}$ during drilling; i.e., MPD systems can be utilized to control the annular pressure profile throughout the wellbore. MPD systems typically include one or more manifolds, one or more gate valves, and a plurality of choke valves. A "choke valve" is a flow restriction device that may have a fixed flow restriction (e.g., a fixed orifice) or a variable flow restriction (e.g., a variable orifice). Choke valves having a variable flow restriction may be configured so the orifice may only be adjusted manually, or only adjusted by an automated feature (e.g., a solenoid valve, etc.), or may be adjusted manually or in automated fashion. The one or more manifolds may be configured to direct fluids into the well or to direct fluids exiting the well to different systems at the drilling rig (e.g., a mud shaker system, one or more flairs, a mud/gas separator, etc. The gate valves may be utilized to allow or prevent fluid flow. The choke valves may be utilized to create a variable flow impediment that selectively affects the pressure of fluids entering the well (e.g., mud) and fluids exiting the well.

Some wells may include a "well control" system in place of or in combination with a MPD system. Well control systems are often utilized as a redundant back up for a MPD system, configured to operate in the event of an issue with the MPD system or an issue that cannot be addressed by the MPD system; e.g., a stuck tool, etc. Like the MPD system, the well control system may include one or more manifolds, one or more gate valves, and one or more choke valves (fixed orifice or adjustable orifice, or some combination of fixed orifice choke valves and adjustable orifice choke valves). Typically, the well control system is not configured as an automated system but rather is controlled by an operator.

Some wells include a diverter manifold (sometimes referred to as a "buffer" manifold) that may be configured to receive well fluids and permit the operator to selectively divert the well fluid to a variety of different systems (e.g., a "mud shaker" or a "cutting separator system" configured to separate mud from well cuttings, a flair where volatiles can be burned off, the MPD system, a trip tank system, a mud/gas separator—"MGS", etc.) depending on the application at hand.

Some wells include a "Rig Manifold" (sometimes referred to as a "Rig Choke" manifold, or a "Choke and Kill" manifold) having a plurality of choke valves and gate valves that can be operated to reduce the fluid pressure at the well head in a controlled manner. In some instances, the choke and kill manifold can be used to direct well fluid exiting the well, or components of the well fluid to different well systems, etc.

The various different prior art fluid control devices and systems, including those that are described above, have historically been configured to operate independent of one another and are therefore independently controlled. In many of these devices/systems, it is necessary for an operator to actuate (e.g., open/close) specific devices in a predetermined sequence to achieve the desired fluid control. The sequential operation is not only time consuming and inefficient, but also increases the opportunity for operator error; e.g., devices actuated out of sequence or not at all, etc. In some instances, when one or more operational parameter changes (e.g., choke valve settings, etc.) are made to a first system, it may be necessary to make the same change, a similar change, or a related change to another system. The lack of communication between the systems, or inability to communicate, may make it necessary for the operator to access and adjust multiple systems, which can add to the inefficient operation and potential for operator error. The lack of communication between prior art systems, or inability to communicate, can also impede operation of the well. For example, a first system may produce an alert (or other information) regarding an operational parameter to an operator. If the "alerting" system does not or cannot provide that information to other systems, then necessary action in the other systems may be reliant on the operator. The prior art multiple systems also require that an operator be knowledgeable in a plurality of different systems.

Hence, there is a need for an integrated approach to well operation, one that facilitates the overall operation of the well, one that decreases the potential for operator error, and one that improves the safe operation of the well.

SUMMARY

According to an aspect of the present disclosure, an integrated control system (ICS) for a well drilling platform is provided, which well drilling platform has a plurality of control systems and devices. The ICS includes a master control and an ICS controller. The master control includes an input device and a display. The ICS controller is in communication with the master control. The ICS controller includes at least one processor that executes instructions, and a memory device that is coupled to the at least one processor and that stores the instructions. The instructions, when executed by the at least one processor, cause the ICS controller to perform at least the following: communicate with each of the control systems to determine a status of each of the control systems; cause the master control display to selectively display status information for at least one of the control systems; in response to an operator input to the master control input device to perform a well drilling platform function, said function requiring a coordinated state between a first of the plurality of control systems and at least a second of the plurality of control systems, configure the at least first of the plurality of control systems and the at least second of the plurality of control systems into the coordinated state; and display updated status information for at least one of the control systems on the master control display.

According to the aspects and embodiments of the present disclosure, the plurality of control systems include a diverter manifold and at least one of a managed pressure drilling system, a well control system, a pressure relief valve system, or a rig manifold.

According to the aspects and embodiments of the present disclosure, in response to the operator input to the master control input device, the stored instructions, when executed by the at least one processor, may cause the ICS controller to configure the diverter manifold and the managed pressure drilling system to the coordinated state.

According to the aspects and embodiments of the present disclosure, the diverter manifold may include a plurality of valves and the managed pressure drilling system may include a plurality of valves. The coordinated state may include a sequential operation of at least one of the plurality of valves of the diverter manifold and at least one of the plurality of valves of the managed pressure drilling system.

According to the aspects and embodiments of the present disclosure, the stored instructions, when executed by the at least one processor, may cause the processor to verify an operational status of the at least one of the plurality of valves of the diverter manifold and the at least one of the plurality of valves of the managed pressure drilling system, and provide an acceptable status indication or an error status indication to the ICS master control display.

According to the aspects and embodiments of the present disclosure, the plurality of control systems may include a diverter manifold and at least one of a managed pressure drilling system, a well control system, a pressure relief valve system, a rig manifold, a mud gas separator, a mud pump system, a trip tank system, or a cuttings separator system.

According to the aspects and embodiments of the present disclosure, in response to the operator input to the master control input device, the stored instructions, when executed by the at least one processor, may cause the ICS controller to configure the diverter manifold, the managed pressure drilling system, and at least one of the well control system, the pressure relief valve system, the rig manifold, the mud gas separator, the mud pump system, the trip tank system, or the cutting separator system to the coordinated state.

According to the aspects and embodiments of the present disclosure, the plurality of control systems include a diverter manifold, a managed pressure drilling system, and a mud pump system. In response to the operator input to the master control input device, the stored instructions, when executed by the at least one processor, may cause the ICS controller to configure the diverter manifold, the managed pressure drilling system, and the mud pump system to the coordinated state.

According to the aspects and embodiments of the present disclosure, the diverter manifold may include a plurality of valves, the managed pressure drilling system may include a plurality of valves, and the mud pump system may include a plurality of valve. The coordinated state may include a sequential operation of at least one of the plurality of valves of the diverter manifold, at least one of the plurality of valves of the managed pressure drilling system, and at least one of the plurality of valves of the mud pump system.

According to the aspects and embodiments of the present disclosure, the stored instructions, when executed by the at least one processor, may cause the processor to verify an operational status of the at least one of the plurality of valves of the diverter manifold, the at least one of the plurality of valves of the managed pressure drilling system, and the at least one of the plurality of valves of the mud pump system, and provide an acceptable status indication or an error status indication to the ICS master control display.

According to the aspects and embodiments of the present disclosure, the master control input device and the master control display device may be combined in a human machine interface.

According to the aspects and embodiments of the present disclosure, the ICS may further include at least one secondary control having an input device and a display.

According to another aspect of the present disclosure, a method of controlling a plurality of control systems on a well drilling platform is provided. The method includes:

providing a master control and an integrated control system (ICS), the master controller having an input device and a display; wherein the ICS controller is in communication with the master control, and the ICS controller has at least one processor that executes instructions, and a memory device that is coupled to the at least one processor and that stores the instructions; and using the ICS controller to: communicate with each of the control systems to determine a status of each of the control systems; cause the master control display to selectively display status information for at least one of the control systems; in response to an operator input to the master control input device to perform a well drilling platform function, said function requiring a coordinated state between a first of the plurality of control systems and at least a second of the plurality of control systems, configure the at least first of the plurality of control systems and the at least second of the plurality of control systems into the coordinated state; and display updated status information for at least one of the control systems on the master control display.

According to the aspects and embodiments of the present disclosure, the plurality of control systems may include a diverter manifold and at least one of a managed pressure drilling system, a well control system, a pressure relief valve system, or a rig manifold.

According to the aspects and embodiments of the present disclosure, the method may include using the ICS controller to configure the diverter manifold and the managed pressure drilling system to the coordinated state.

According to the aspects and embodiments of the present disclosure, the diverter manifold may include a plurality of valves and the managed pressure drilling system may include a plurality of valves, and the step of using the ICS controller to configure the diverter manifold and the managed pressure drilling system to the coordinated state may include sequentially operating at least one of the plurality of valves of the diverter manifold and at least one of the plurality of valves of the managed pressure drilling system.

According to the aspects and embodiments of the present disclosure, the method may include using the ICS controller to verify an operational status of the at least one of the plurality of valves of the diverter manifold and the at least one of the plurality of valves of the managed pressure drilling system, and provide an acceptable status indication or an error status indication to the ICS master control display.

According to the aspects and embodiments of the present disclosure, the plurality of control systems may include a diverter manifold, a managed pressure drilling system, and a mud pump system, and the method may include using the ICS controller to configure the diverter manifold, the managed pressure drilling system, and the mud pump system to the coordinated state.

According to the aspects and embodiments of the present disclosure, the diverter manifold may include a plurality of valves, the managed pressure drilling system may include a plurality of valves, and the mud pump system may include a plurality of valves, and the step of using the ICS controller to configure the diverter manifold, the managed pressure drilling system, and the mud pump system to the coordinated state may include sequentially operating at least one of the plurality of valves of the diverter manifold, at least one of the plurality of valves of the managed pressure drilling system, and at least one of the plurality of valves of the mud pump system.

According to the aspects and embodiments of the present disclosure, the method may include the step of using the ICS controller to verify an operational status of the at least one of the plurality of valves of the diverter manifold, the at least one of the plurality of valves of the managed pressure drilling system, and the at least one of the plurality of valves of the mud pump system, and provide an acceptable status indication or an error status indication to the ICS master control display.

The features of the present disclosure will become apparent in light of the detailed description of the invention provided below, and as illustrated in the accompanying drawings.

DETAILED DESCRIPTION

Figure 1:
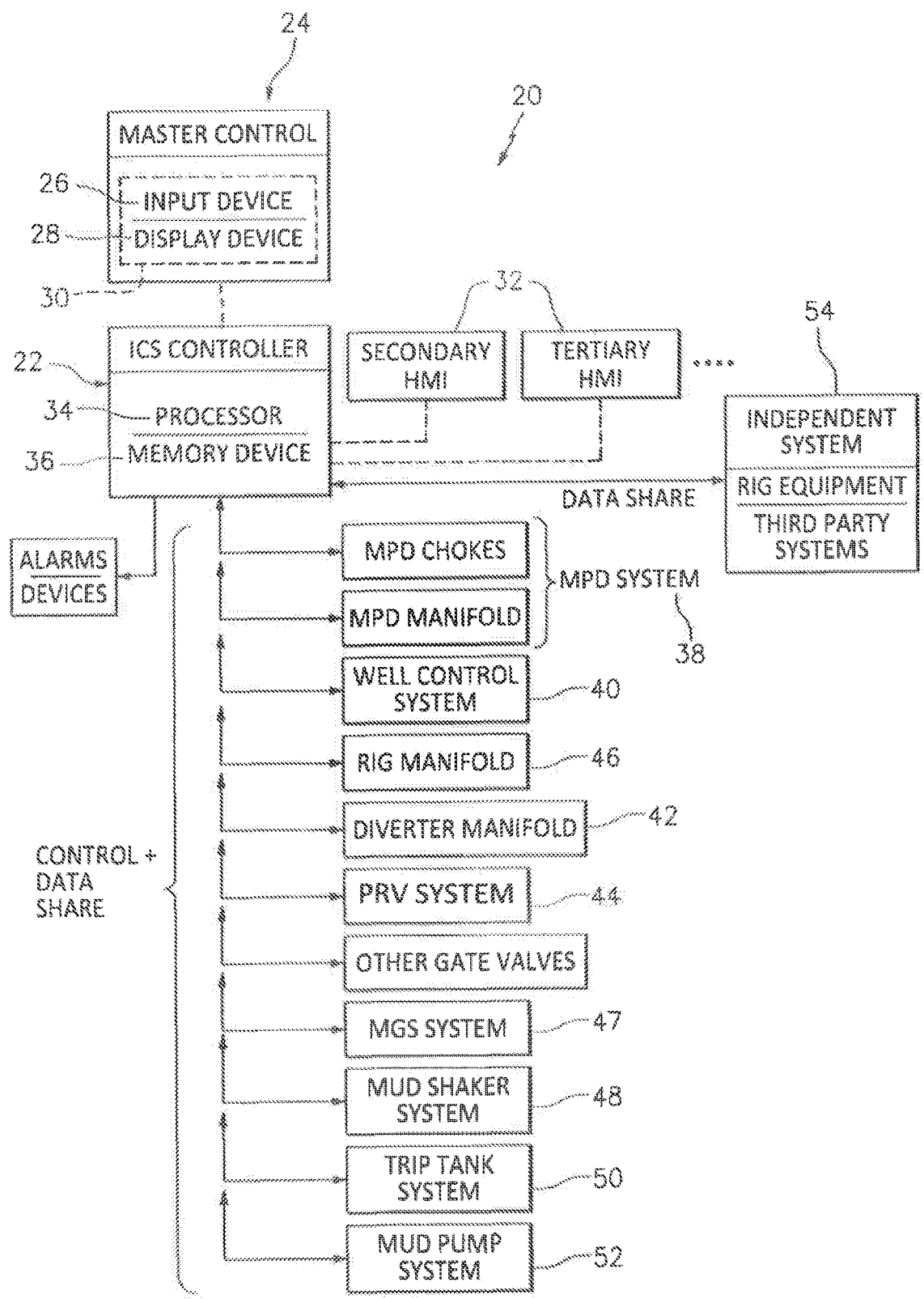
FIG. 1 is an exemplary diagram of an embodiment of the present integrated control system.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

Aspects of an integrated control system 20 for use with a well drilling platform, and methods for controlling aspects of the well drilling platform are provided. The term "well drilling platform" refers to a system for drilling a hole that extends into the earth typically for the purpose of, but not limited to, bringing hydrocarbon fluids (e.g., oil and/or gas) to the surface. The aforesaid well drilling platforms may be located onshore or offshore. Well drilling platforms located offshore may have a subsea wellhead or may have a dry wellhead. As will be discussed below, a well drilling platform may include a variety of different systems and devices that participate in the well drilling process, including but not limited to a managed pressure drilling (MPD) system, a well control system, a diverter manifold (sometimes referred to as a buffer manifold), a pressure relief valve (PRV) system, and a rig manifold (sometimes referred to as a choke and kill manifold).

The integrated control system 20 (referred to hereinafter as the "ICS") includes at least one ICS controller 22 and a master control 24 having an input device 26 and a display device 28. The operator input device 26 (e.g., HMI, a keyboard, a key pad, a touch screen, switches, joysticks, etc.) is configured to allow an operator to input instructions, data, etc. to the ICS controller 22. The display device 28 (e.g., HMI, a CRT monitor, a flat-panel display, an LCD, etc.) is configured to receive information from the ICS controller 22 and display the same or different information to the operator. In addition to the visual capabilities of the display device 28, the ICS may also include audible capabilities for providing information to the operator. In a preferred embodiment, the operator input device 26 and display device 28 are combined in the form of a human machine interface (HMI) 30. The master control HMI 30 cooperates with the ICS controller 22 to provide a graphics based visualization (e.g., that may include a graphical user interface) that allows an operator to interact (e.g., input instructions and read displayed information) with the ICS. The master control HMI 30 may be configured to operate as a touch screen, and may include a graphic user interface ("GUI") input capability (e.g., a symbols that can be "clicked" on via a mouse, or a touch screen) or may be used in combination with a conventional input device 26 (e.g., a keyboard or keypad), or some combination thereof. In addition to the master control 24, the ICS 20 may include a plurality of secondary control stations 32 (referred to hereinafter as "secondary control HMIs"; e.g., the preferred form) located at different locations on the well drilling platform (e.g., see FIG. 1). The secondary control HMIs 32 can be configured in a variety of different ways. For example, one or more of the secondary control HMIs 32 may be configured to display information, and not permit information or control input. Alternatively, a secondary control HMI 32 may be configured to enable an operator to control (and monitor) the ICS 20 from a location remote from the master control 24. Hence, the specific functionality of a secondary control HMI 32 may be the same as the master control HMI 30, or it might be configured to provide less information and/or control capabilities than the master control HMI 30. The ICS 20 may be set up with security profiles that grant privileges to specific operators and/or secondary control HMIs 32; e.g., some operators may have full privileges, while others have less privileges. In addition, the ICS controller 22 may be configured such that the master control HMI 30 and the secondary control HMIs 32 are in a master/slave arrangement to avoid contradictory operator input, etc., or more generically, one HMI control may be identified as the master, and the other HMI controls as slaves; e.g., when one of the HMI controls is designated as a master, the other HMI screens may only have viewing capabilities and no ability to edit or modify operational parameters. The ICS controller 22 may be configured so that when data or commands are input at the HMI then acting as the master, the stored instructions cause the ICS controller 22 to automatically update the data or device status shown at the other HMIs.

The ICS controller 22 (i.e., any of the controllers) may include any type of computer, computing device, computational circuit, or any type of processing circuit capable of executing a series of instructions that are stored in a memory device 36. The ICS controller 22 may include one or more processors and/or multicore CPUs (collectively referred to hereinafter as a processor 34 to facilitate the description). The processor 34 may be a microprocessor, a digital signal processor, a co-processor, a micro-controller, a microcomputer, a central processing unit, a field programmable gate array, a programmable logic device, a state machine, logic circuitry, analog circuitry, digital circuitry, etc., and any combination thereof. The instructions stored in the memory device 36 may represent logic instructions (e.g., commands), one or more algorithms, etc., for operating some or all of the ICS 20, and therefore to control various different systems and devices included as part of the well drilling platform.

The stored instructions are not limited to any particular form (e.g., program files, system data, buffers, drivers, utilities, system programs, etc.) provided they can be executed by the controller 22; e.g., by the processor 34 included in the controller 22. The memory device 36 may be a non-transitory computer readable storage medium configured to store instructions that when executed by the processor, cause the processor to perform or cause the performance of certain functions or commands. The memory device 36 may be a single memory device or a plurality of memory devices. The memory device 36 may include a storage area network, network attached storage, as well a disk drive, a read-only memory, random access memory, volatile memory, non-volatile memory, static memory, dynamic memory, flash memory, cache memory, and/or any device that stores digital information.

As indicated herein, the ICS controller 22 is configured to communicate with various systems and devices on the well drilling platform, and therefore includes whatever stored instructions are required to perform such communication. The aforesaid communications include data transfer to and from systems and/or devices on the well drilling platform. Non-limiting examples of protocols that can be used to for purposes of data transfer include Profibus, Digital, Analog, ASCII, profinet, Ethernet etc.

As indicated above, a well drilling platform may include a variety of different systems and devices that participate in the well drilling process; e.g., an MPD system 38, a well control system 40, a diverter manifold 42, a PRV system 44, a rig manifold 46, etc. The specific configuration of each of these systems and devices, and how they are utilized, is often customized for the particular well drilling platform; e.g., to satisfy the requirements of the particular well being drilled. Non-limiting examples of these systems, their functionality, and how they interact with one another are described below to illustrate the utility of the present ICS 20.

The ICS controller 22 includes logic (e.g., stored instructions, algorithms, etc.) that is applicable to the specific configuration of the systems and devices of the particular well drilling platform with which the ICS 20 is utilized, and defines how the aforesaid systems and devices interact (i.e., coordinate) with one another given a particular task to be completed or operational scenario that may occur. Hence, the ICS controller 22 logic (e.g., stored instructions, algorithms, etc.) is operable to cause the systems and devices of the well drilling platform to assume coordinated respective configurations (i.e., coordinated states) that permit a function to be accomplished on the well drilling platform using the aforesaid systems and devices using the ICS 20.

For example, as indicated above some well drilling platforms may include an MPD system 38 configured to monitor and control the annular pressure profile throughout the wellbore during the normal course of drilling; e.g., to maintain a substantially constant $P_{BH}$ during drilling. The MPD system 38 typically includes at least two MPD choke valves, one or more gate valves, one or more manifolds and may include a controller (i.e., an "MPD controller"). In the present ICS 20, choke valves may be controlled directly or indirectly by the ICS controller. For example, the ICS 20 will permit the operator to operate the MPD manifold; e.g., to reroute a fluid flow initially passing through a first choke valve and away from a second choke valve, subsequently through the second choke valve and away from the first choke valve—i.e., coordinate the states of the first and second choke valves. A person of skill in the art will recognize that the MPD manifold may be disposed in a variety of different configurations to accomplish the aforesaid rerouting.

The MPD system 38 can be operated to control the circulation of drilling fluids during normal drilling operations. The particular circulation path of the drilling fluids may be modified via the MPD manifold and valving (and possibly the diverter manifold as well) to satisfy different operational scenarios/requirements; e.g., create a fluid flow path for drilling fluid to the MPD choke, or create a fluid flow path for return drilling fluid (that may include gas influxed during drilling, and/or cuttings produced during drilling) to a mud-gas separator (MGS) 47, or create a fluid flow path to a device 48 (e.g., a "mud shaker" or "cuttings separator system") configured to remove cuttings from the drilling fluid, or create a fluid flow path to a trip tank system 50 where fluid exiting the well can be stored and evaluated, etc. The MPD controller may be configured to execute stored instructions, to communicate with the ICS controller 22 (and vice versa), to receive and execute instructions from the ICS controller 22, and to send data (e.g., valve status, fluid pressure data, etc.) to the ICS controller 22. The ICS controller 22 can therefore alone or in combination with the MPD controller execute stored instructions that cause it to create a desired fluid flow path (e.g., actuate automated gate valves associated with the MPD system 38, automated valves associated with the diverter manifold 42, etc.). Hence, the ICS 20 is configured to permit the operator to selectively monitor and control the MPD system 38 from, for example, an ICS control HMI as will be explained below. The present ICS 20 is not limited to use with any particular MPD system 38.

As indicated above, well drilling platforms typically include a well control system 40. Such well control systems 40 may be configured to provide similar or the same functionality as the MPD system 38, but may be implemented as a redundant back up to the MPD system 38. In the event of a malfunction within the MPD system 38 or if it is desirable to bypass the MPD system 38, the well control system 40 can be operated to control the annular pressure profile throughout the wellbore. The well control system 40 may include at least two automated choke valves, one or more gate valves, one or more manifolds, and a well control system controller. In a manner similar to that described above vis-à-vis the MPD system 38, the well control system 40 may be configured to control the circulation of drilling fluids during drilling operations. The particular circulation path of the drilling fluids may be created via the well control manifold and valving (and possibly the diverter manifold as well) to satisfy different operational scenarios/requirements (e.g., see scenarios described above with respect to the MPD system 38). In those instances wherein the well control system 40 includes a controller, the well control system controller may be configured to execute stored instructions, to communicate with the ICS controller 22 (and vice versa), to receive and execute instructions from the ICS controller 22, to send data (e.g., valve status, fluid pressure data, etc.) to the ICS controller 22, etc. The ICS controller 22 can therefore alone or in combination with the well control system controller execute stored instructions that cause it to create a desired fluid flow path (e.g., actuate automated gate valves associated with the well control system, automated valves associated with the diverter manifold, etc.). Hence, the ICS 20 may be configured to allow the operator to monitor and control the well control system 40, for example from an ICS control HMI as will be explained below. The present ICS 20 is not limited to use with any particular well control system 40.

As indicated above, most well drilling platforms include a diverter manifold 42 that may be configured to receive well fluids and permit the operator to selectively divert well fluid to a variety of different systems (e.g., a mud shaker 48 configured to separate mud from well cuttings, a flair where volatiles can be burned off, the MPD system 38, a trip tank system 50, a mud/gas separator 48, etc.) depending on the application at hand. The ICS controller 22 can, by executing stored instructions, create the desired fluid flow path on the well drilling platform (e.g., through the diverter manifold 42) by actuating automated valves (e.g., automated gate valves, etc.). The present ICS 20 is not limited to use with any particular diverter manifold 42.

As indicated above, most well drilling platforms includes a rig manifold 46 having a plurality of choke valves and gate valves that can be operated to reduce the fluid pressure at the well head in a controlled manner. Here again, the ICS controller 22 can, by executing stored instructions, cause the rig manifold 46 (e.g., via operation of the automated choke valves and gate valves, etc.) to, for example, reduce the fluid pressure at the well head in a controlled manner. The present ICS 20 is not limited to use with any particular rig manifold 46.

As indicated above, most well drilling platforms includes a mud pump system 52 for pumping the drilling fluid (i.e., the "mud"), which drilling fluid may include a mixture of fluids, solids and chemicals that is tailored to provide the correct physical and chemical characteristics required to safely drill the well. Here again, the ICS controller 22 can, by executing stored instructions, cause the mud pump system 52 (e.g., via operation of automated choke valves and pumps, etc.) to provide the drilling fluid at a predetermined pressure and flow rate. The present ICS 20 is not limited to use with any particular type of mud pump system 52.

As indicated above, most well drilling platforms includes a PRV system 44 that can be configured and operated to protect the mud pump system 52 and/or to maintain pressure within a well. A variety of different PRV systems 44 are available, each typically including a PRV, a hydraulic power unit (HPU) having one or more pumps (which may be powered by a pneumatic source available on the well drilling platform), a hydraulic fluid reservoir, one or more accumulators, one or more solenoid operated directional valves, gate valves, pressure sensors, etc. PRV systems 44 often include one or more controllers dedicated to the PRV system 44. Here again, the ICS controller 22 can provide the instructions necessary to produce the desired operation of the PRV system 44 and to receive information (e.g., valve status information, pressure data, etc.) from the PRV system 44. The present ICS 20 is not limited to use with any particular PRV system 44.

The ICS may also be in communication (e.g., receive/send information) with other systems or devices present on a well drilling platform that are not controlled by the ICS 20; i.e., independent systems 54, such as rig equipment, third party systems, etc. These independent systems 54 may provide information inputs to the ICS 20 (e.g., pressure values, temperature values, equipment status, etc.).

During operation of the well drilling platform, the ICS 20 permits the operator to centrally monitor and/or control the various different systems and devices (e.g., like those described above, but not limited thereto) through the master control 24; e.g., to cause the systems and devices of the well drilling platform to assume coordinated respective configurations (i.e., coordinated states) that permit a function to be accomplished on the well drilling platform using the aforesaid systems and devices using the ICS. As indicated above, the master control 24 is configured to allow the operator to input instructions and information to the ICS controller 22 via an input device 26, and receive information from the ICS controller 22 via a display. To simplify the description below, the master control 24 will described in terms of an HMI configuration, but the master control 24 is not limited thereto.

FIG. 1 diagrammatically illustrates an embodiment of the ICS controller 22 in direct or indirect communication with the various systems and devices of the well drilling platform (e.g., including those systems and devices described above), as well as independent systems 54 that are not controlled by the ICS 20. The communication (which may include data, commands, etc.) may be from the ICS controller 22 to the various systems and devices, from the various systems and devices to the ICS controller 22, or both. The ICS controller 22 therefore receives information from the various systems and devices regarding the status of particular devices, sensor data, and/or operational data (e.g., valve position or status, fluid flow rates, fluid volume in and out of the well, pressure data, temperature data, pump strokes for mud pumps, pit gain, ROP, differential pressure data for a mud-gas separator 47 (MGS), etc.), which data may upon receipt be stored within a memory device portion of the ICS controller 22.

To control one or more of the various systems and devices of the well drilling platform, an operator may input information and/or commands into the ICS via the master control HMI 30, which input may be received by the ICS controller 22. Upon receipt of the operator input, the instructions stored within the memory device 36 of the ICS controller 22 may be executed and the processor 34 will cause a system or device within the well drilling platform to operate. For example upon receipt of the operator input, the instructions stored within the ICS controller 22 may operate devices (e.g., valves) within the MPD system 38 (and possibly the diverter manifold 42) to reroute fluid flow from a first fluid path through a first MPD choke valve to a second fluid path away from the first MPD choke valve and through a second MPD choke valve. As another example, upon receipt of the operator input, the instructions stored within the ICS controller 22 may open a fluid path (e.g., by automated valves) that allows drilling fluid exiting the well to pass through to a trip tank system 50 where the aforesaid drilling fluid may be evaluated. The trip tank system 50 may include sensors that indicate when the trip tank contains a sufficient amount of drilling fluid, which sensor input can be sent to the ICS controller 22. The instructions stored within the ICS controller 22 may cause the devices that created the fluid path to the trip tank system 50 to close and thereby prevent further fluid flow into the trip tank.

In addition to the ability of the ICS to control systems or devices of the well drilling platform via operator input, the ICS controller 22 may be configured to automatically control systems or devices of the well drilling platform. For example, if sensors within the MPD system 38 indicate that a MPD choke valve is malfunctioning, the instructions stored within the ICS controller 22 (alone or in combination with the MPD controller) may, in response to the sensor input, operate devices (e.g., valves) within the MPD system 38 (and possibly the diverter manifold 42) to reroute fluid flow from a first fluid path through the malfunctioning MPD choke valve to a second fluid path away from the malfunctioning MPD choke valve and through a second back up MPD choke valve.

In both of these operational modes (i.e., system or device changes in response to operator input, or an automated response), the ICS 20 has the stored input from the various systems and devices (e.g., pressure sensor input, valve status, valve position feedback, mud pump strokes, fluid volume into and out of the well, pit gain, etc.) regarding the then current status of the system components and devices and therefore the knowledge regarding which if any of the system components and devices must be actuated or otherwise operationally altered to accomplish the desired operational change of the respective system. The instructions stored within the ICS controller 22 cause the ICS controller 22 to communicate the appropriate signals/communications to the appropriate systems/devices to actuate or otherwise operationally alter to accomplish the desired operational change. In the prior art systems of which we are aware, the devices within the various systems on the well drilling platform (e.g., valves, etc.) must be operated at a system level (i.e., the operator must access and operate each system independently) in order to accomplish the desired function; e.g., redirect fluid to a MGS 47, to a trip tank system 50, etc. With the ICS 20, the operator can in a single location (e.g., at the ICS master control HMI 30) change the status of devices (e.g., valves) in a plurality of different systems to accomplish the aforesaid desired function. The ICS 20 therefore: 1) avoids the need to have an operator interact with each well operating platform system independently, and potentially have to actuate or operationally actuate each necessary device; 2) provides coordination between the independent well operating systems not possible under the prior art systems; and 3) provides a safety measure to ensure the proper steps are taken vis-à-vis the stored instructions.

The ICS controller 22 may also assist with a change of process identification as well. For example, when the well drilling platform is in a first operational mode, the need to change or modify the operational mode may arise based on received/monitored operational parameters. In such a scenario, the ICS controller 22 may be configured to produce an alert at the master control HMI 30 (visual and/or audible). Upon receiving the alert, the operator may use the alert information to take action; e.g., actuate/transition systems and/or devices on the well drilling platform. For example, when the MPD system 38 is operating to control the well drilling platform, the MPD choke is typically utilized to control well pressures. In this scenario, the ICS controller 22 includes logic that may cause the system to monitor certain operational parameters. If the ICS controller 22 detects that a kick is being experienced within the well, the ICS controller 22 may alert the operator to take action. Alternatively or in combination, stored instructions may cause the ICS controller 22 to automatically well control systems/devices to safely handle the kick.

A change in well drilling scenario may make it useful to change one or more set point pressures within the PRV system 44 used for surface drilling equipment (mud pump, riser etc.). Instead of using an independent PRV system 44 (as is typically required with prior art systems), the ICS controller 22 may include stored instructions that allow the ICS controller 22 (alone or in combination with a PRV system controller) to adjust PRV set pressures. In this scenario, changes to PRV system 44 set pressures can be made at the master control 24 of the ICS 20. Similarly, a change in well drilling scenario may make it useful to change one or more set point pressures for the MPD chokes within the MPD system. Instead of using an independent MPD system 38, the ICS controller 22 may include stored instructions that allow the ICS controller 22 (alone or in combination with a MPD system controller) to adjust MPD set pressures. In this scenario, changes to MPD choke set pressures can be made at the master control 24 of the ICS 20. As yet further examples, the ICS controller 22 may include stored instructions that allow the ICS controller 22 to adjust the well control choke(s) and rig choke manifold at a single location.

As another example of the capability of the ICS 20, the stored instructions within the ICS controller 22 can cause the ICS 20 to actuate devices in a predetermined sequential manner, and thereby avoid the need to actuate (e.g., open or close) a series of valves one by one, which valves may be present in different systems. Hence, this is another example wherein with the ICS 20, the operator can in a single location (e.g., at the ICS master control HMI 30) change the status of devices (e.g., valves) in a plurality of different systems to accomplish the aforesaid desired function. The stored instructions in the ICS controller 22 may also include the capability to stop a particular function or to provide an error/failure indication if, for example, a particular valve in the sequence is malfunctioning (e.g., a valve required to be in an open state for a particular function is unable to be opened, or is not open for any reason). The ability of the ICS 20 to centrally control a number of independent systems/device on the well drilling platform also provides the operator with the ability to monitor and utilize coordinated system/valve operation; e.g., apply interlocks, where when a certain valve is open, another valve should be in closed position and vice versa. Hence, the ICS 20 can provide additional safety capability. As an example of sequential operation possible with the present ICS 20, under certain circumstances it may be desirable to divert some amount (or all) fluid flow from the well to a MGS 47. In that instance, the operator may select a MGS mode on the master control HMI 30. Upon receiving the operator input to initiate the MGS mode, the stored instructions may cause the ICS controller 22 to automatically sequence particular valves to open and close to redirect the fluid flow within the diverter manifold 42 to pass to the MGS 47. As another example, under certain circumstances it may be desirable to divert some amount (or all) fluid flow from the well to a trip tank system 50. To accomplish that task, the operator may select a trip tank mode on the master control HMI 30. Upon receiving the operator input to initiate the trip tank mode, the stored instructions will cause the ICS controller 22 to automatically sequence the requisite valves in the diverter manifold 42, the MPD manifold, and other miscellaneous valves to open and close to redirect the fluid flow to pass to the trip tank system 50.

Figure 2:
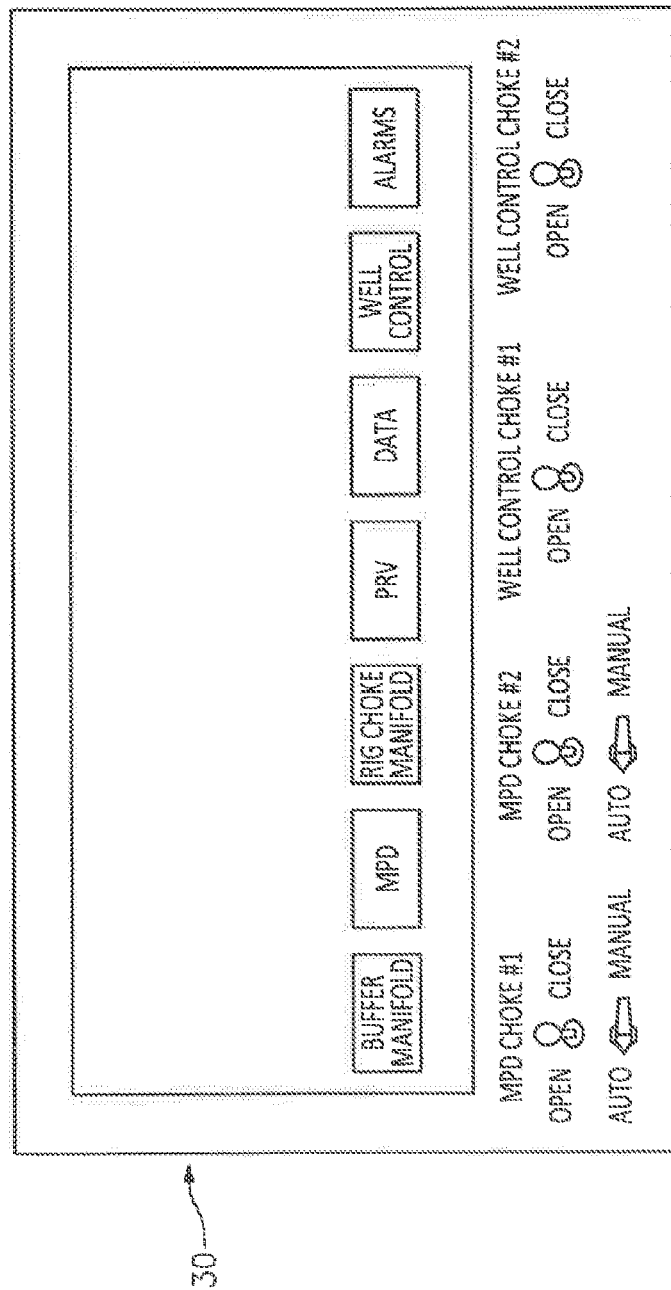
FIG. 2 is a diagrammatic illustration of a master control embodiment.

The ICS master control 24 can be configured in a variety of different ways, and can be customized to suit particular applications. For example, FIG. 2 provides a diagrammatic illustration of a master control 24 embodiment that includes a plurality of mechanical control devices (e.g., joysticks and switches) and a touch screen type HMI display. The HMI display screen may be configured to provide predetermined types of information to the operator (e.g., MPD choke valve status and/or well control choke valve status), operational indicators (e.g., indicators of normal operation or warning indicators for abnormal operation, etc.), and GUI buttons that the operator can actuate via the HMI touch screen. In the exemplary HMI display screen shown in FIG. 2, the GUI buttons allow the operator to pop up different HMI screens that may be relevant to specific systems of the well drilling platform (e.g., the diagrammatic representation in FIG. 2 shows GUI buttons for "Buffer Manifold", "MPD", "Rig Choke Manifold", "PRV", "Data", "Well Control", and "Alarms"). The diagrammatic representation in FIG. 2 is a non-limiting example of an HMI master control 24.

Figure 3:
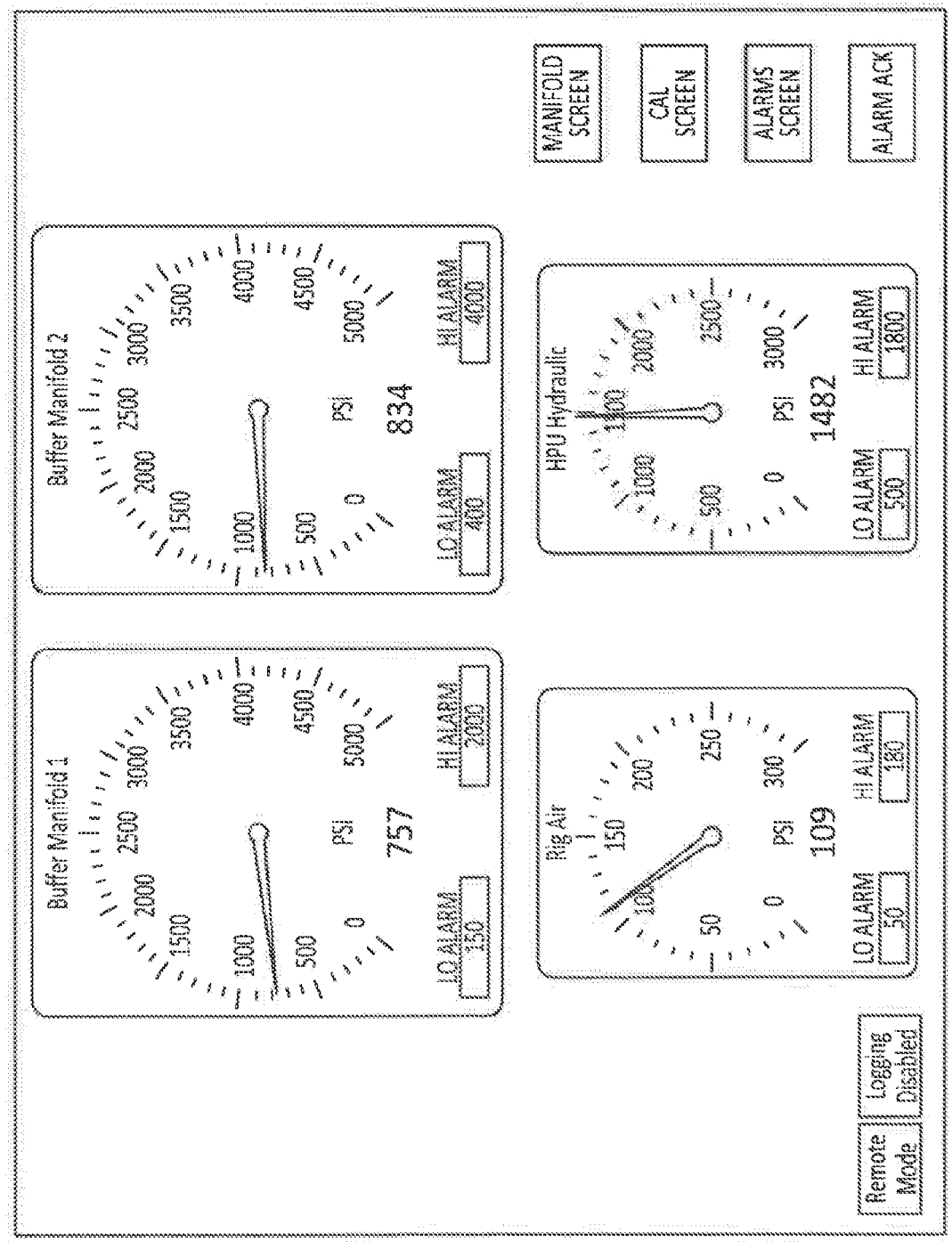
FIG. 3 is a diagrammatic illustration of a "Buffer Manifold" HMI display screen embodiment.

FIG. 3 is a diagrammatic representation of a "Buffer Manifold" HMI display screen that can be accessed by the operator actuating the GUI button for "Buffer Manifold" on the main control HMI screen. This example of a "Buffer Manifold" display screen (i.e., a diverter manifold screen) includes a "Buffer Manifold 1" pressure display indicating the sensed fluid pressure within a first buffer/diverter manifold, a "Buffer Manifold 2" pressure display indicating the sensed fluid pressure within a second buffer/diverter manifold, a "Rig Air" pressure display indicating the sensed air pressure from a pneumatic air source on the well drilling platform, and a "HPU Hydraulic" pressure display indicating the sensed hydraulic fluid pressure produced by a hydraulic power unit (e.g., a hydraulic power unit portion of the PRV system). Additional GUI buttons are shown that can be actuated by the operator to change HMI screens (e.g., change to a manifold screen, a calibration screen, an alarms screen, etc.), or to acknowledge an alarm, or to permit remote operation of the ICS and a secondary control HMI located elsewhere on the well drilling platform, or to disable logging. This exemplary manifold HMI screen could be used as a template for other manifolds; e.g., MPD manifolds, well control system manifolds, etc.

Figure 4A:
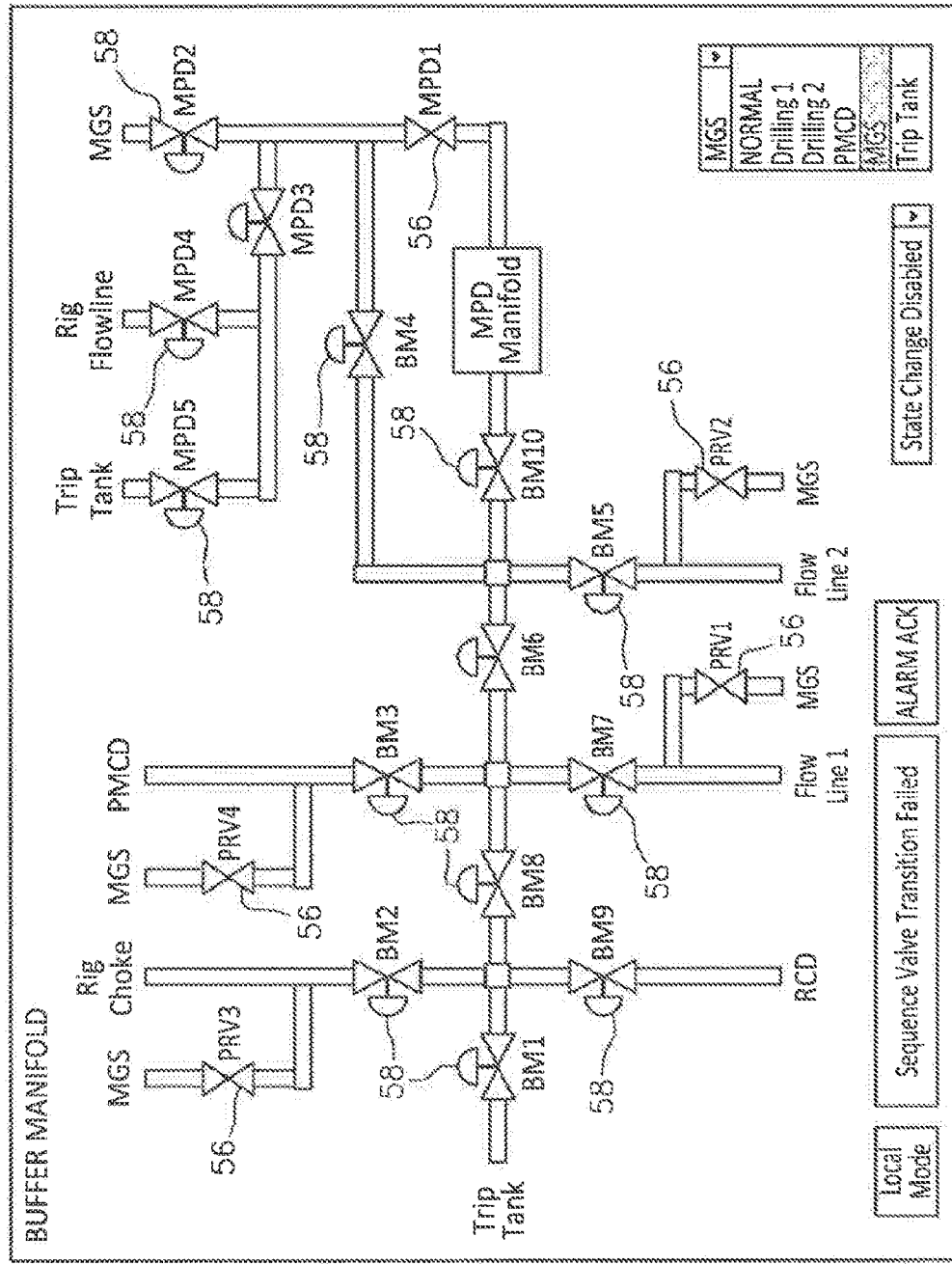
FIG. 4A is a diagrammatic illustration of a Buffer Manifold screen layout embodiment.
Figure 4B:
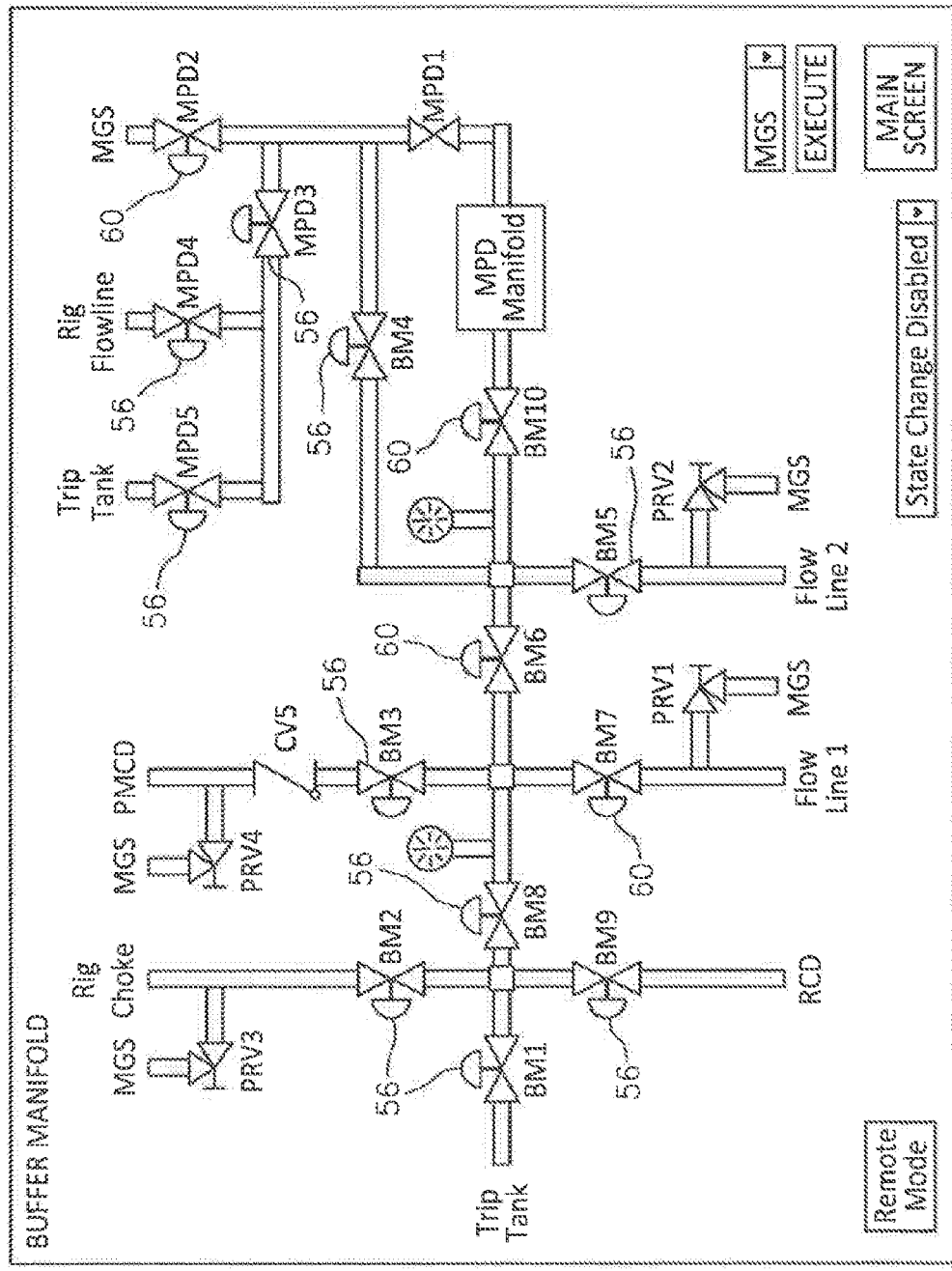
FIG. 4B is a diagrammatic illustration of the Buffer Manifold screen layout embodiment shown in FIG. 4A, with an implemented functionality.

FIGS. 4A and 4B are diagrammatic illustrations of a Buffer Manifold screen layout diagrammatically illustrating the valves associated with the buffer manifold (i.e., diverter manifold 42) and the fluid flow paths associated therewith. In FIG. 4A, the selection screen in the lower right hand corner allows the operator to choose a valve sequencing for a particular function (e.g., MGS, Normal, Drilling 1, Drilling 2, PMCD, MGS, and Trip Tank). In this example, the MGS routing function is highlighted but not yet selected. Valves shown in red 56 on the HMI display are indicated as closed, and valves shown in yellow 58 are in transition. In FIG. 4B, the operator has chosen the valve sequencing to permit fluid flow to the MGS 47, as indicated in the selection screen in the lower right hand corner. Valves shown in red 56 on the HMI display are indicated as closed and valves shown in green 60 are open, illustrating a fluid flow path from Flow Line 1 to the MGS 57 via the MPD manifold. Hence, the operator is able to see and control the status of valves and the consequent fluid path in and through a plurality of different systems and devices on the well control platform at a single location.

Figure 5:
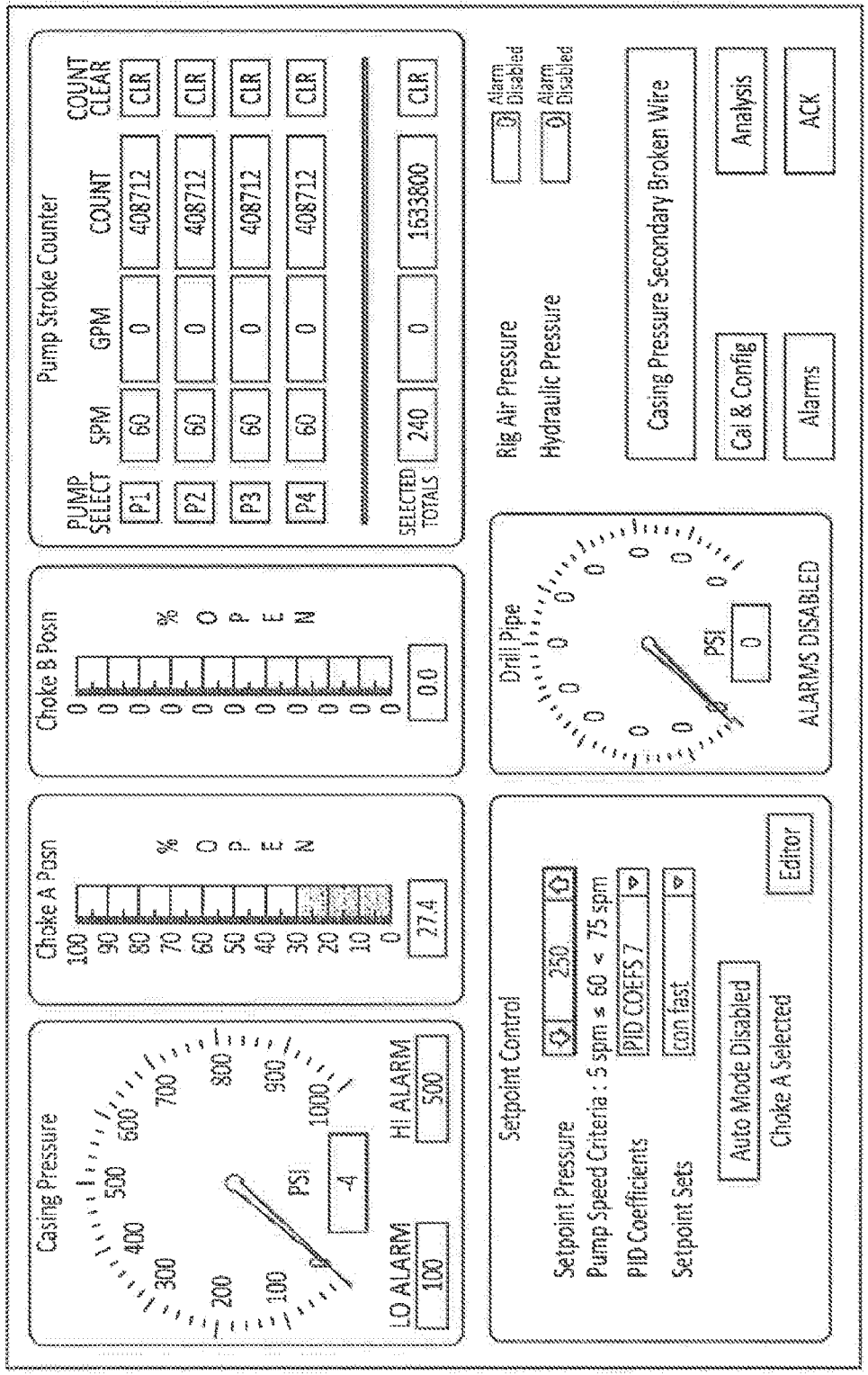
FIG. 5 is a diagrammatic illustration of an HMI MPD Main Screen display layout embodiment.

FIG. 5 is a diagrammatic illustration of an exemplary HMI MPD Main Screen display layout including a Casing Pressure indicator, a Choke A position indicator, a Choke B position indicator, a Pump Stroke Counter indicator, a Set-point Control indicator, a Drill Pipe indicator, a Rig Air Pressure indicator, a Hydraulic Pressure indicator, an alarm indicator, and GUI buttons for "Cal & Config", Alarms, Analysis, and ACK. The Casing Pressure indicator visually provides a fluid pressure value in the well casing, and also indicates the high and low alarm pressure presets. Hence, pressure sensors within the well casing send signals to the ICS controller 22 which interprets the signals and displays pressure values associated with the aforesaid sensor signals. The Choke A and Choke B position indicators indicate the percentage that each respective MPD choke valve is open (i.e., Choke A is indicated as 27.4% open, and Choke B is indicated as closed). The percentage that the choke valves are open may be detected by positional sensors in communication with the respective choke valve, which positional sensors send signals to the ICS controller 22 which interprets the signals and displays the positional data. The Pump Stroke Counter indicator visually displays the strokes per minute ("SPM") and the total count of pump strokes for one or more mud pumps used on the well drilling platform. In this example, the data from four different mud pumps (P1, P2, P3, and P4) is displayed. The pump stroke data is provided to the ICS controller 22 from the Mud Pump system. The ICS controller 22 interprets the data and displays the data on the HMI display screen for each of the respective mud pumps. The Setpoint Control indicator visually provides setpoint pressure data based on a mud pump operation criteria, and provides a means for displaying and changing operational settings to suit the need at hand. The Drill Pipe indicator visually provides a fluid pressure value within the drill pipe. Pressure sensors send signals to the ICS controller 22 which interprets the signals and displays drill pipe pressure values associated with the aforesaid sensor signals. The Rig Air Pressure indicator visually provides an air pressure value for the air provided by the pneumatic pressure source on the well drilling platform (the PRV system may utilize pneumatic air to power pumps, etc.). Pressure sensors send signals to the ICS controller 22 which interprets the signals and rig air pressure values associated with the aforesaid sensor signals. The Hydraulic Pressure indicator visually provides a fluid pressure value for hydraulic fluid; e.g., hydraulic fluid pressure within the PRV system 44. Pressure sensors send signals to the ICS controller 22 which interprets the signals and rig air pressure values associated with the aforesaid sensor signals. The GUI button for "Cal & Config" provides a means by which an operator can enter into a calibration and configuration HMI screen to access and modify calibration and configuration data and settings. The GUI button for "Alarms" provides a means by which an operator can enter into an alarms HMI screen to access alarm data and include the ability to modify alarm settings. The GUI button for "Analysis" provides a means by which an operator can enter into an analysis HMI screen to access certain types of analysis data (e.g., pertaining to fluid flow or well drilling performance data, etc.), or may provide a means by which an operator can input commands to the ICS controller 22 to perform certain analyses.

Figure 6:
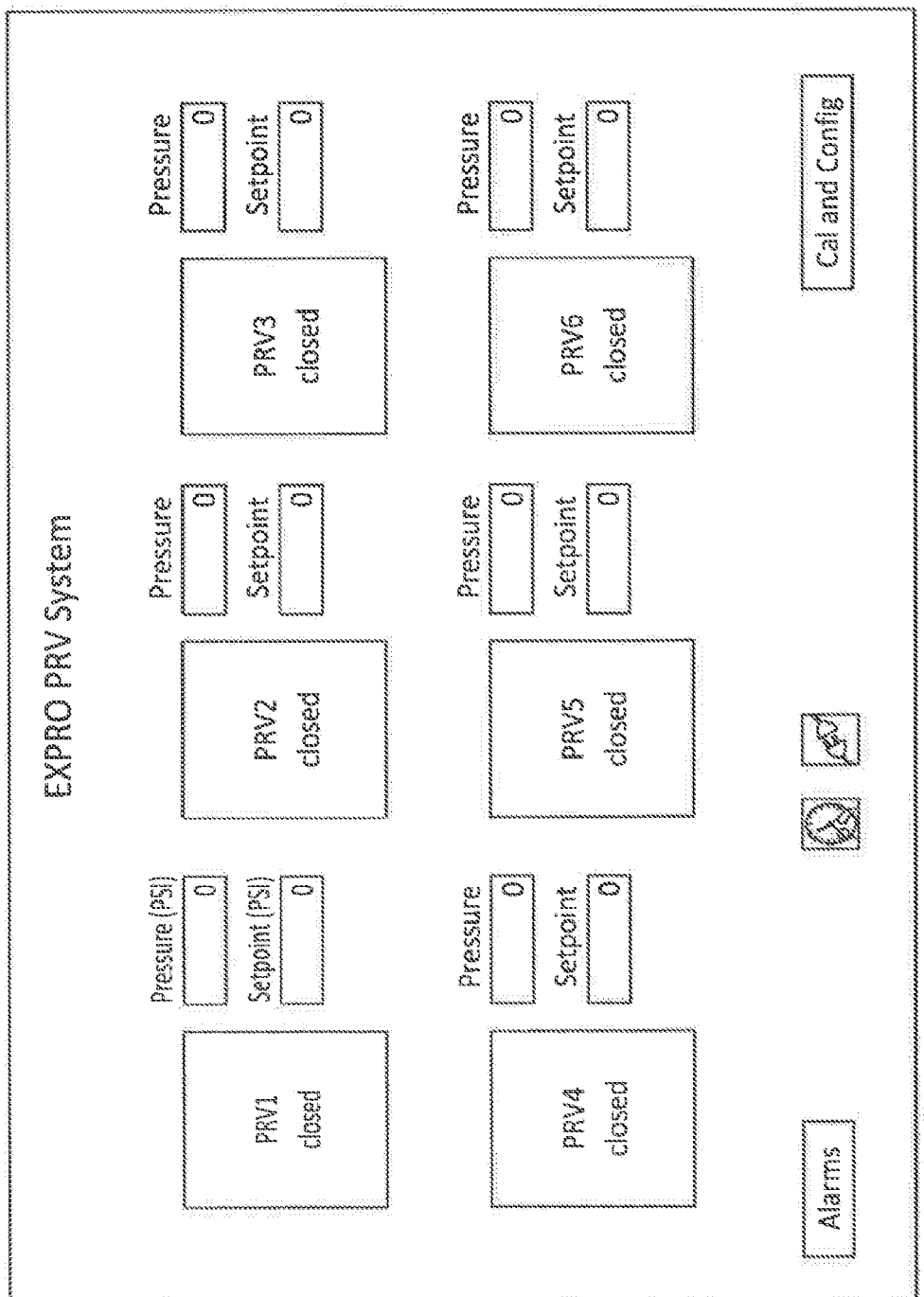
FIG. 6 is a diagrammatic illustration of a PRV display layout embodiment.

FIG. 6 is a diagrammatic illustration of an exemplary PRV display layout including a plurality of PRV displays, and Alarm GUI button, and a Cal & Config GUI button. Each PRV display includes an open/closed indicator, a pressure value indicator and a setpoint indicator. The GUI button for "Cal & Config" provides a means by which an operator can enter into a calibration and configuration HMI screen to access and modify calibration and configuration data and settings for a respective PRV.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. An integrated control system (ICS) for a well drilling platform, the well drilling platform having a plurality of control systems and a diverter manifold, the diverter manifold including a first portion connected to a first control system of the plurality of control systems, a second portion connected to a second control system of the plurality of control systems and a plurality of automated valves, the ICS comprising:
   a master control having an input device and a display;
   an ICS controller in communication with the master control, the ICS controller having at least one processor that executes instructions, and a memory device that is coupled to the at least one processor and that stores the instructions that, when executed by the at least one processor, cause the ICS controller to perform at least the following:
   communicate with each of the control systems to determine a status of each of the control systems;
   cause the master control display to selectively display status information for at least one of the control systems;
   in response to an operator input to the master control input device to perform a well drilling platform function, said function requiring a coordinated state between the first control system and the second control system, configure the first control system and the second control system into the coordinated state;
   wherein configuring into the coordinated state includes:
   selectively configuring, by the ICS controller, the automated valves of the diverter manifold into a selected one of a first configuration and a second configuration, the selected one configuration being associated with the well drilling platform function;
   wherein, in the first configuration, a fluid flow is routed through the diverter manifold to the first control system and away from the second control system; and
   wherein, in the second configuration, the fluid flow is routed through the diverter manifold to the second control system and away from the first control system; and
   display updated status information for at least one of the control systems on the master control display;
   wherein the well drilling platform further comprises a pressure relief valve system including a first pressure relief valve having a first setpoint and operatively connected along the routing through the diverter manifold to the first control system for releasing fluid therefrom when the first setpoint is exceeded and a second pressure relief valve having a second setpoint and operatively connected along the routing through the diverter manifold to the second control system for releasing fluid therefrom when the second setpoint is exceeded, and:
   wherein the ICS controller is in communication with the pressure relief valve system to cause the respective setpoint of each respective pressure relief valve to be remotely configurable; and
   wherein configuring into the coordinated state further includes:
   remotely configuring, using the ICS controller, the respective setpoint of the respective pressure relieve valve associated with the selected one configuration with a setpoint value associated with the well drilling platform function.

2. The ICS of claim 1, wherein the plurality of control systems includes at least one of a managed pressure drilling system, a well control system, a pressure relief valve system, or a rig manifold.

3. The ICS of claim 2, wherein the plurality of control systems includes the managed pressure drilling system; and in response to the operator input to the master control input device, the stored instructions, when executed by the at least one processor, cause the ICS controller to configure the managed pressure drilling system and a second of the plurality of control systems to the coordinated state.

4. The ICS of claim 3, wherein the managed pressure drilling system includes a plurality of managed pressure drilling valves; and
wherein configuring into the coordinated state includes a sequential operation, using the ICS controller, of at least one of the plurality of automated valves of the diverter manifold and at least one of the plurality of managed pressure drilling valves of the managed pressure drilling system.

5. The ICS of claim 4, wherein the stored instructions, when executed by the at least one processor, verify an operational status of the at least one of the plurality of automated valves of the diverter manifold and the at least one of the plurality of valves of the managed pressure drilling system, and provide an acceptable status indication or an error status indication to the master control display.

6. The ICS of claim 1, wherein the plurality of control systems includes at least one of a managed pressure drilling system, a well control system, a pressure relief valve system, a rig manifold, a mud gas separator, a mud pump system, a trip tank system, or a cuttings separator system.

7. The ICS of claim 6, in response to the operator input to the master control input device, the stored instructions, when executed by the at least one processor, cause the ICS controller to configure the diverter manifold, the managed pressure drilling system, and at least one of the well control system, the pressure relief valve system, the rig manifold, the mud gas separator, the mud pump system, the trip tank system, or the cutting separator system to the coordinated state.

8. The ICS of claim 1, wherein the plurality of control systems include a managed pressure drilling system and a mud pump system; and
in response to the operator input to the master control input device, the stored instructions, when executed by the at least one processor, cause the ICS controller to configure the diverter manifold, the managed pressure drilling system, and the mud pump system to the coordinated state.

9. The ICS of claim 8, wherein the managed pressure drilling system includes a plurality of valves, and the mud pump system includes a plurality of valves; and
wherein configuring into the coordinated state includes a sequential operation, using the ICS controller, of at least one of the plurality of automated valves of the diverter manifold, at least one of the plurality of valves of the managed pressure drilling system, and at least one of the plurality of valves of the mud pump system.

10. The ICS of claim 9, wherein the stored instructions, when executed by the at least one processor, verify an operational status of the at least one of the plurality of automated valves of the diverter manifold, the at least one of the plurality of valves of the managed pressure drilling system, and the at least one of the plurality of valves of the mud pump system, and provide an acceptable status indication or an error status indication to the master control display.

11. The ICS of claim 1, wherein the master control input device and the master control display device are combined in a human machine interface.

12. The ICS of claim 1, further comprising at least one secondary control having an input device and a display.

13. A method of controlling a plurality of control systems on a well drilling platform, the drilling platform further comprising a diverter manifold including a first portion connected to a first control system of the plurality of control systems and a second portion connected to a second control system of the plurality of control systems and a plurality of automated valves, the method comprising:
providing a master control and an integrated control system (ICS), the master control having an input device and a display;
wherein the ICS controller is in communication with the master control, and the ICS controller has at least one processor that executes instructions, and a memory device that is coupled to the at least one processor and that stores the instructions; and
using the ICS controller to:
communicate with each of the control systems to determine a status of each of the control systems;
cause the master control display to selectively display status information for at least one of the control systems;
in response to an operator input to the master control input device to perform a well drilling platform function, said function requiring a coordinated state between the first control system and the second control system, configure the first control system and the second control system into the coordinated state; and
wherein configuring into the coordinated state includes:
selectively configuring, by the ICS controller, the automated valves of the diverter manifold into a selected one of a first configuration and a second configuration, the selected one configuration being associated with the well drilling platform function;
wherein, in the first configuration, a fluid flow is routed through the diverter manifold to the first control system and away from the second control system; and
wherein, in the second configuration, the fluid flow is routed through the diverter manifold to the second control system and away from the first control system; and
display updated status information for at least one of the control systems on the master control display;
wherein the well drilling platform further comprises pressure relief valve system including a first pressure relief valve having a first setpoint and operatively connected along the routing through the diverter manifold to the first control system for releasing fluid therefrom when the first setpoint is exceeded and a second pressure relief valve having a second setpoint and operatively connected along the routing through the diverter manifold to the second control system for releasing fluid therefrom when the second setpoint is exceeded, and:
wherein configuring into the coordinated state further includes:
communicating, using the ICS controller, with the pressure relief valve system to cause the respective setpoint of each respective pressure relief valve to be remotely configurable; and
remotely configuring, using the ICS controller, the respective setpoint of the respective pressure relieve valve associated with the selected one configuration with a setpoint value associated with the well drilling platform function.

14. The method of claim 13, wherein the first control system is a managed pressure drilling system; and wherein configuring into the coordinated state further includes configuring the diverter manifold and the managed pressure drilling system into the coordinated state.

15. The method of claim 14, wherein the managed pressure drilling system includes a plurality of valves; and wherein the using the ICS controller to configure the diverter manifold and the managed pressure drilling system to the coordinated state includes sequentially operating at least one of the plurality of automated valves of the diverter manifold and at least one of the plurality of valves of the managed pressure drilling system.

16. The method of claim 15, further comprising using the ICS controller to verify an operational status of the at least one of the plurality of automated valves of the diverter manifold and the at least one of the plurality of valves of the managed pressure drilling system, and provide an acceptable status indication or an error status indication to the ICS master control display.

* * * * *